Aug. 10, 1943.  E. C. NICHOLIDES  2,326,247
SPEED EXHIBITING DEVICE
Filed Dec. 11, 1942   4 Sheets-Sheet 1
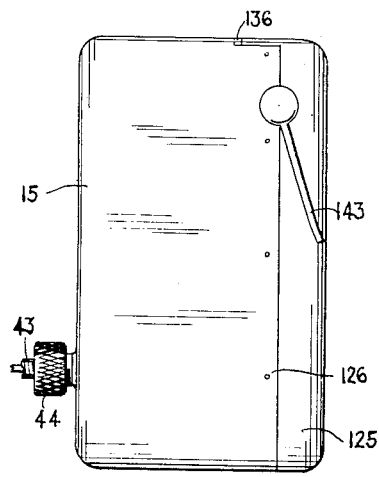
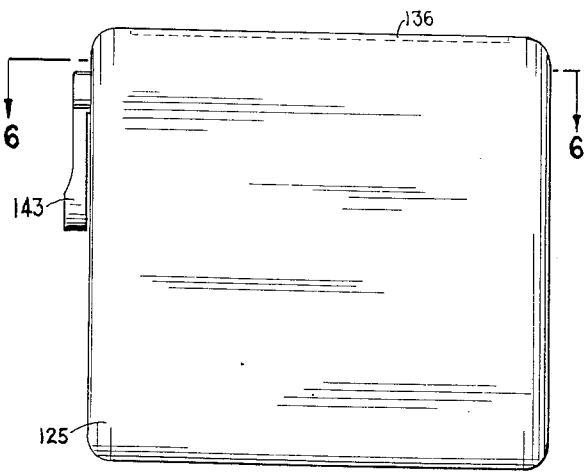
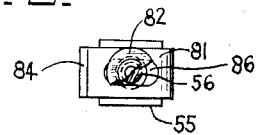
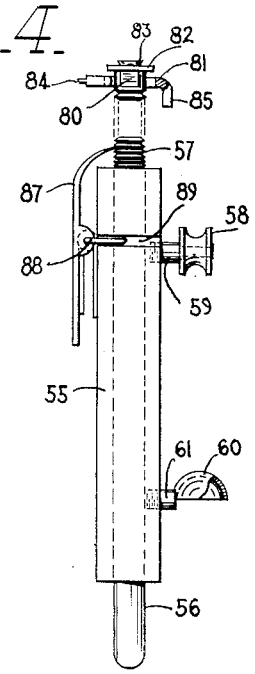
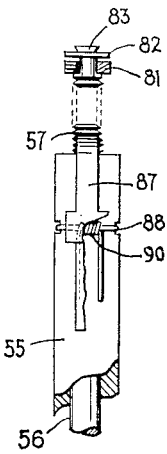
INVENTOR
E. C. NICHOLIDES
BY
ATTORNEY

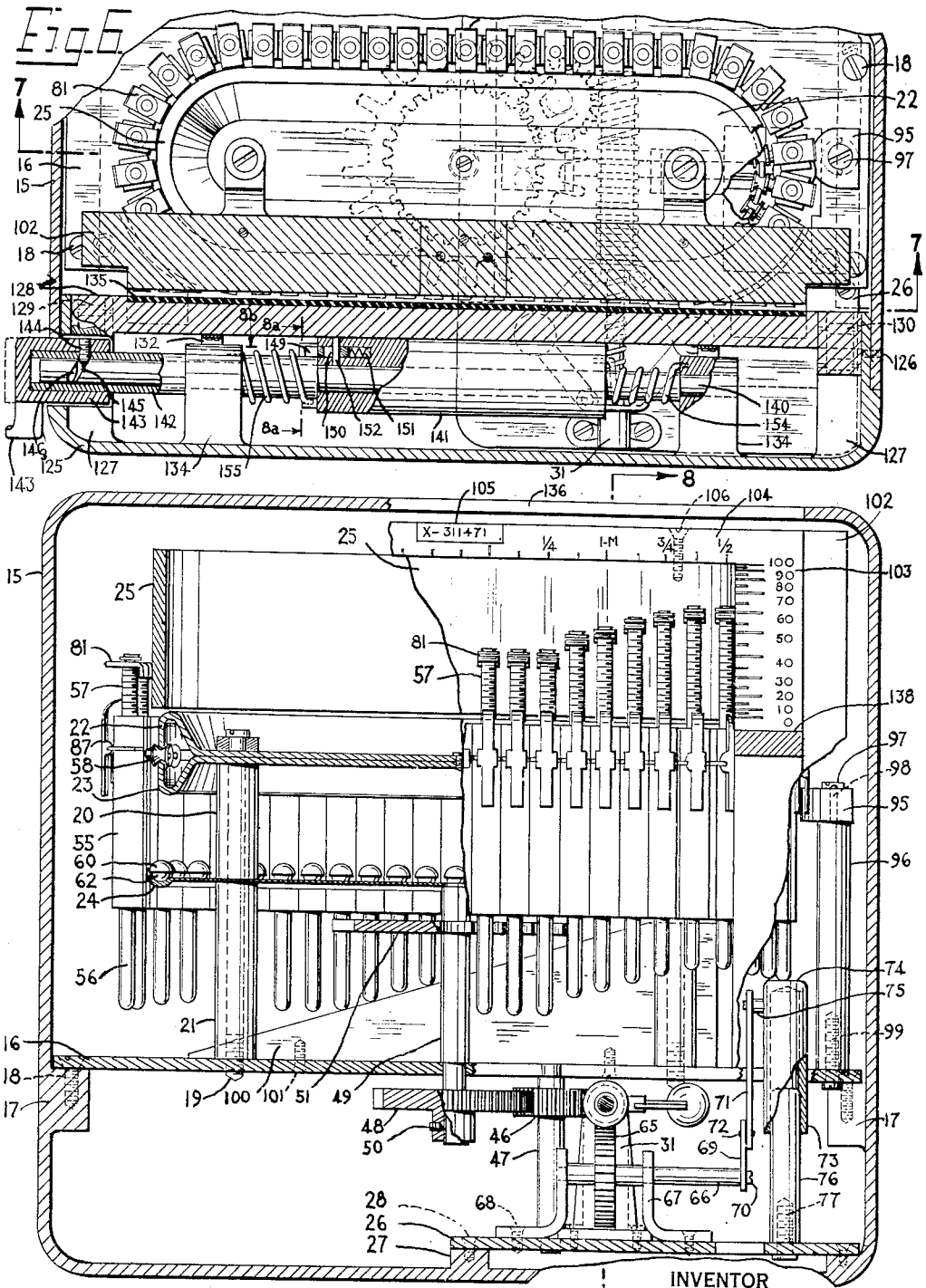

Aug. 10, 1943.  E. C. NICHOLIDES  2,326,247
SPEED EXHIBITING DEVICE
Filed Dec. 11, 1942  4 Sheets-Sheet 3
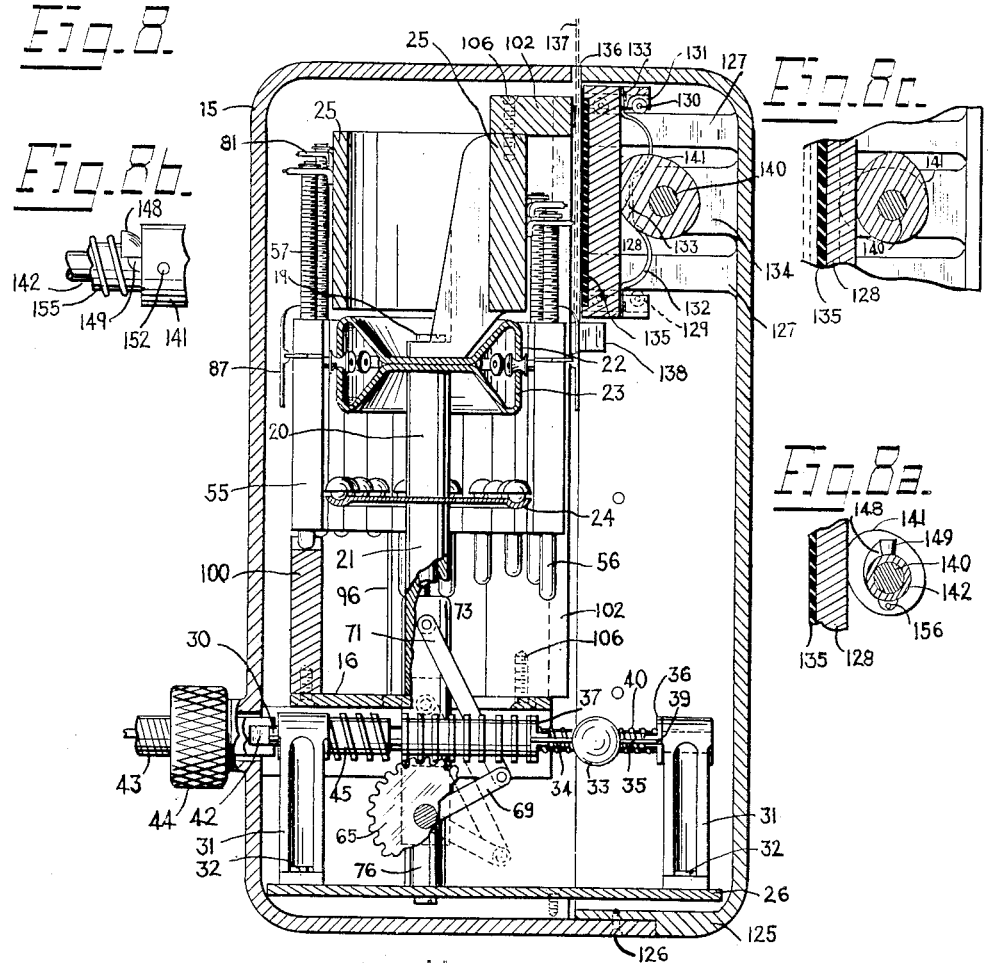
INVENTOR
E.C.NICHOLIDES
BY S M Prieles
ATTORNEY Aug. 10, 1943.  E. C. NICHOLIDES  2,326,247
SPEED EXHIBITING DEVICE
Filed Dec. 11, 1942  4 Sheets-Sheet 4
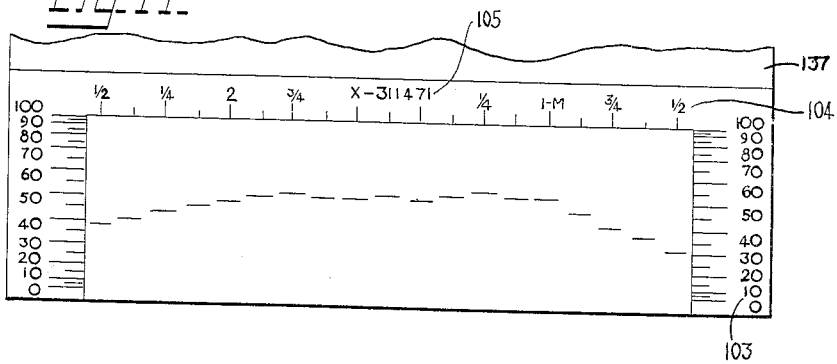
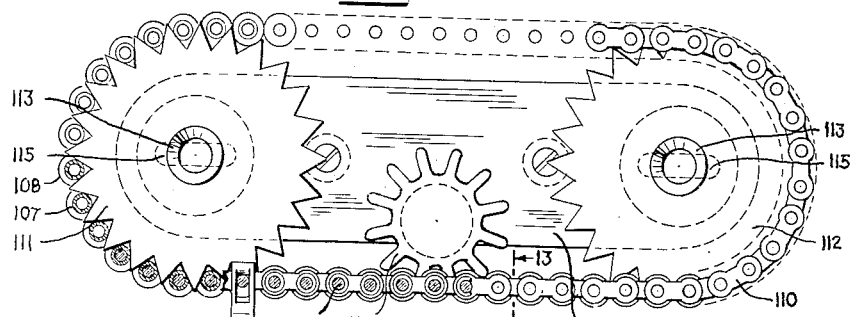
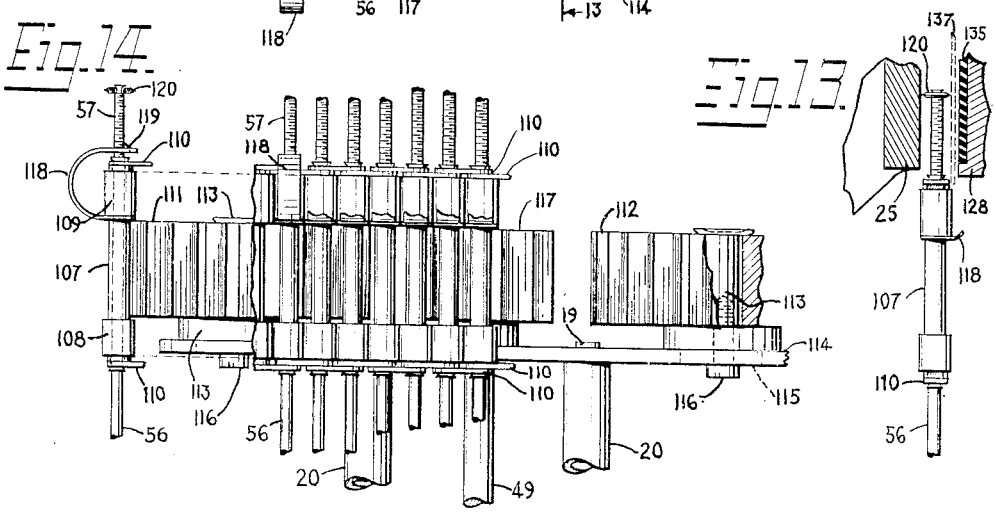
INVENTOR
E.C. NICHOLIDES
BY
ATTORNEY Patented Aug. 10, 1943

2,326,247

UNITED STATES PATENT OFFICE 2,326,247

SPEED EXHIBITING DEVICE

Emmanuel Christ Nicholides, Chicago, Ill.

Application December 11, 1942, Serial No. 468,682

3 Claims. (Cl. 264—1)

This application is a continuation-in-part of application Serial No. 262,649, filed March 18, 1939.

This invention relates to speed indicating and recording devices and has among its objects an improved device for producing a speed diagram showing the speeds at which a moving body, such as a motor vehicle, traveled during a predetermined preceding distance; and the combination of such indicating device with means for recording such speed diagram.

The foregoing and other objects of the invention will be best understood from the following description of an exemplification thereof illustrated in the accompanying drawings, wherein Fig. 1 is a side view of the assembled speed indicating and recording device;

Fig. 2 is a front view of the device;

Fig. 3 is a detailed view of the indicating bracket;

Fig. 4 is a detailed view of the block and indicator pin assembly;

Fig. 5 is a detailed front view of the block and indicator pin assembly;

Fig. 6 is a top view of the device along the line 6—6 of Fig. 2;

Fig. 7 is a vertical cross-sectional view of the device along the line 7—7 of Fig. 6;

Fig. 8 is a side vertical cross-sectional view of the device along 8—8 of Fig. 7;

Fig. 8a is a detailed cross-sectional view along line 8a—8a of Fig. 6;

Fig. 8b is an elevational view in the direction of arrow 8b of Fig. 6 showing a portion of the printing mechanism;

Fig. 8c is a detailed cross-sectional view of the printing mechanism showing its action;

Fig. 9 is a top view of the clip control cam showing its action;

Fig. 10 is a front view of the indicator pins and associated elements under the same operating conditions of Fig. 9;

Fig. 11 is a detailed view of the imprinted speed diagram;

Fig. 12 is a top view of another indicator pin assembly in the form of a simple sprocket link chain;

Fig. 13 is a detailed view of an indicator pin bushing along the line 13—13 of Fig. 12; and Fig. 14 is a front view similar to Fig. 7 showing the link chain assembly.

The device of the invention solves this problem by providing a simple mechanism which keeps making a diagram of the speed of the moving body, such as a vehicle, and retains a part of the speed diagram which shows the speed of the moving body over the last part of its motion in such form that an imprint of the speed diagram may be readily made. The device of the invention enables thus an officer who stops a speeding vehicle to determine the maximum speed at which the vehicle has traveled over a distance before it was brought to a stop. It also enables the officer to make a record of the speeds at which the vehicle traveled over said distance.

The exemplification of the invention shown in the drawings comprises a casing 15 of cast metal, for instance, provided with a mounting plate 16 attched to flanges 17 of the casing by screws 18. To the mounting plate 16 are attached by screws 19 and spacer posts 20 and 21 three additional track-shaped metal plates 22, 23, 24 and a metal guide 25. Fitting the interior of the casing is also another mounting plate 26 secured to the flanges 27 of the casing by screws 28.

As shown in Fig. 8, on a governor shaft 30 journaled in bearings 31 secured to the inward mounting plate 26 by screws 32, is mounted a centrifugal governor formed by governor weights 33 linked by links 34 and 35 to two collars 36, 37 seated on the shaft 30, collar 36 being affixed to the shaft, as by pin 39, and the elongated collar 37 being free to slide on the shaft so that the centrifugal action of the governor weights moves the collar 37 along the shaft toward the collar 36 against the action of the spring 40 to a position corresponding to the momentary speed imparted to the shaft 30.

One end of the shaft is provided with a squared portion 42 arranged for coupling to the end of a flexible shaft 43 by means of a coupling member 44 threadedly fitting over a nipple extending from the casing 15. As shown in Figs. 6 and 7, one portion of the shaft 30 is provided with a worm 45 which drives gear 46 mounted on shaft 47 supported between the plates 16 and 26 and engaging gear 48 attached to shaft 49 by set screw 50. On the upper end of the shaft 49, supported between the plates 24, 25, is mounted gear 51 which through its associated gearing acquired an angular velocity proportional to that of the governor shaft.

As shown in Figs. 3 to 8, a series of closely spaced metal blocks 55 which guide in vertical holes a series of slidingly mounted indicator pins 56 with threaded portions 57, are arranged to form an endless chain and move along a track formed by plates 22, 23, 24. Each block 55 is provided with a roller 58 held on a shaft 59, and a cup-shaped ball bearing socket 60 attached to the block as by means of pin 61. The rollers 58 ride freely on the upper level of the track formed by facing edges of the guide plates 22 and 23, while the sockets 60 holding ball bearings 62 ride on the lower level of the track formed by the edge of plate 24. This arrangement of rollers and ball bearings assures that the blocks 55 ride freely on the track while maintaining their vertical positions.

The toothed periphery of gear 51 engages the lower portions of the indicator pins 56 and drives through them their respective blocks 55 along their track with a velocity proportional to the velocity of the governor shaft and the speed of the vehicle. As a result, each block with its associated indicator pin will complete one revolution around the track at the end of any predetermined distance traveled by the vehicle.

As shown in Figs. 7 and 8, the momentary position of the longitudinally slidable shaft collar 37 is determined by the speed of the rotation imparted to the governor shaft 30 by the flexible shaft 43. The surface of this slidable collar 37 is provided with circular teeth which are arranged to engage a gear wheel 65 mounted on a shaft 66 supported between two mounting brackets 67 held on the mounting plate 26 by screws 68. The motion of gear wheel 65 is transmitted through link arm 69 secured to the end of shaft 66 by means of lock screw 70, and an arm 71 pivotally attached to arm 69 as by pin 72, to a vertically slidable pin position cylinder 73 pivotally attached to arm 71 by pin 75 having a flat top end 74 located along the path of the speed indicator pins 56 and restrained by its internal guide shaft 76 to slide only in a vertical direction so as to stop the engaged pin 56 in a position corresponding to the momentary speed of the governor shaft 30 in the way described hereinafter. As a result, the vertical position of the top 74 of pin driving position cylinder 73 corresponds at all times to the momentary speed imparted to the governor shaft 30 which in turn corresponds to the speed of the vehicle with which the apparatus is associated.

As shown in detail in Figs. 3, 4 and 5, the top end of each indicator pin 56 has a flat portion 80 on which is loosely held an indicator bracket 81 which is retained by a washer 82, clamped to the end of the pin as by spinning its portion 83. Each indicator bracket 81 is provided with a raised portion 84 on one end, and a downward bent portion 85 on the other end, which rests against guide 25, thus preventing the indicator bracket from turning while in motion, and keeping the raised portions 84 with their faces outward all around the chain. Each indicator bracket 81 is also provided with a slot 86 which allows sufficient play between the bracket and indicator pin so that any pressure exercised upon the bracket 81 will be taken up by guide 25 so as to prevent imposition of any strain on the indicator pins 56. The threaded portion 57 of pins 56 is engaged by a metal clip 87 which is pivotally mounted on the pin block 55 as by means of a shaft 88 welded to the block grooves 89. Each clip 87 is pressed by a coil spring 90 against the threaded portion 57 to retain each pin in its maximum upward position to which it is pushed by the governor actuated position cylinder 73.

As shown in Figs. 6, 7, 9 and 10, adjacent to the pin position cylinder 73 is mounted a metal cam 95 held by screw 97 and pins 98 on a post 96 which is attached to the mounting plate 16 by screw 99. As shown in Figs. 6, 7 and 8, an inclined metal cam 100 is held by screws 101 on the rear side of the lower mounting plate 16 along the path of the indicator pins and terminating in front of the position cylinder 73 shaped to slowly raise each pin 56 to its maximum allowable vertical position as each pin 55 moves over to the cam 100 toward the location above position cylinder 73.

As the chain of pin blocks 55 is moved in a clockwise direction and a block 55 with its associated indicator pin 56, after being raised by cam 100 to its highest level, reaches position a in Figs. 9 and 10, just above the position cylinder 73, the edges portion of release cam 95 comes in contact with the associated clip 87 and tilts it so as to release the threaded portion 57 of the indicator pin 56 allowing the pin to drop by its own gravitational force until its lower end rests on the top 74 of the position cylinder 73. As the block advances to position b, the lower end of the pin still rests on top 74 of the position cylinder 73, but the clip 87 is disengaged from cam 95 and again grips the threaded portion 57 of the indicator pin, so that after leaving its engagement with the position cylinder, the indicator pin 56 is retained in the position determined by the vertical displacement of the top 74 of the indicator pin position cylinder 73, which in turn corresponds to the momentary speed of the vehicle. As the motion of the chain continues, each successive block and indicator pin assembly is subjected to the same series of operations and each pin 56 retains a position imparted thereto by the position cylinder 73 until after traveling half way round the track or more, its lower end engages the top surface of cam 100 at which point the pin will be gradually reset to its maximum upward vertical position.

As shown in Figs. 7 and 8, the flat array of upwardly projecting indicator pins 56 which face the front of the casing, is bounded by frame 102 which is aligned with the indicator brackets 81 and is provided with raised speed scale numerals 103, a raised mileage scale 104, and a serial number block 105, so as to form with the indicator brackets 81 located at the upper ends of the indicator pins 56 a speed diagram, such as shown in Fig. 11, indicating the speeds at which the vehicle traveled over the indicated distance. The crank arms 69, 71 which actuate the position cylinder 73 are so arranged that in the most important speed region, for instance, between 30 and 80 miles, the speed scale graduations are large to permit more accurate determination of the speed reached by the vehicle while traveling at a speed of this region.

Another form of arrangement for forming a drive for indicator pins of the type described above is shown in Figs. 12 to 14. An endless simple sprocket-like link chain may be used as a guide support of the speed indicator pins. The link chain comprises a series of hollow cylindrical bushings 107 provided at their ends with collars 108, 109 and interconnected into an endless chain by links 110 held in place as by spinning. The chain so formed is threaded over two idler gears 111 and 112, the teeth of which fit into the space between the bushing collars 108 and 109. The idler gears 111 and 112 are revolvably mounted on shafts 113 which are mounted through somewhat larger holes 115, on mounting plate 114, so as to permit adjusting of the gear spacing. Motion is imparted to the chain by gear 117 which is driven by the governor shaft as in the arrangement of Figs. 1 to 8. The gears 111, 112, 117 are made of a silent drive material, such as laminated duck material impregnated with a synthetic resin.

Instead of providing an indicator bracket 81 on the upper end of each indicator pin 56, the upper ends of the indicator pins may be provided with cylindrical rollers 120 which engage guide 25 while it moves in front of the printing platen 128 so as to make it possible to imprint the speed indications in a sheaf of sheets 137 placed in the slot 136, in the way described hereinafter in connection with the device of Figs. 1 to 8.

A speed indicating device of the type described above may be mounted on the dash board of a car so that the speed diagram of the motion of the car formed by the indicator elements 81 along the diagram portion of the guideway, in the manner shown in Fig. 7, shall be exposed to view, being suitably enclosed, for instance, by a transparent cover of plastic material. A traffic officer provided with a standard camera, on stopping the car, would merely have to snap a picture of such speed diagram, together with the vehicle identification number X-311471, for instance, as shown in Fig. 11, in order to make a conclusive record of the maximum speed at which the car was traveling during the period immediately before it was brought to a stop. Such record would supply a positive proof of the maximum speed at which the vehicle travelled before it was brought to a stop and would eliminate the differences of opinion that arise between a traffic officer and the motorist as to the guilt of the motorist or the actual speed of the vehicle, the record of the maximum speed being conclusive.

Such speed indicating device will also frequently save the motorist from paying fines, by rendering impossible biased charges and testimony of speeding by a hostile traffic officer. The conclusive and indisputable proof as to whether the motorist is guilty or innocent supplied by such record will also save much time in trying cases.

A distinct phase of the present invention is the arrangement and utilization of the maximum speed measuring device so as to make it possible to facilitate imprinting of the record of the maximum speed indication on simple duplicate slips of paper, such as the traffic violation ticket ordinarily handed by the traffic officer to a driver of a vehicle.

In Figs. 1, 2, 6, 7, 8, 8a, 8b and 8c is shown one form of a recording mechanism for enabling simple and quick recording of the speed indication as well as the identifying or other pertinent data that would be useful in establishing a permanent record of the various speeds of the particular vehicle acquired in traveling a predetermined distance.

The recording mechanism is shown mounted in a cover member 125 which is secured to the casing 15 by means of screws 125 in front of the scale frame 102. The hollow cover 125 has inwardly projecting guides 127 on which is mounted a platen 128 equipped with rollers 129 held in grooves 131 of platen 128, by pins 130 allowing the platen to move freely in a direction towards the scale frame 102. The platen 128 is normally held in a neutral position by two band springs 132 having ends attached to platen 128 by screws 133 and centers attached to the projecting cover bearings 134. In a shallow channel of the platen 128 facing the scale frame 102 and the indicator brackets 81 is seated a yieldable compression sheet 135, of rubber, for instance.

The cover member 125 is so shaped and arranged as to form a slot 136 between the exposed face of the scale frame 102, and the edges 84 of the indicator brackets 81 and the facing surface of the cover member 125 and platen 128, to permit the insertion of a sheaf of one or more leaves of printing material 131, such as paper, into the space facing the scale frame and indicator brackets. Such a sheaf of papers may consist, for instance, of duplicate or triplicate copies of a summons directing the operator of the vehicle to answer for a speed violation, and the sheets may be combined with carbon backings so that when the platen presses the sheets towards the indicator bracket edges 84 and scale frame 102, a speed diagram as shown in Fig. 11 will be imprinted upon the sheets showing the various speeds the vehicle had acquired during a predetermined distance, also an identifying legend, such as a serial number of the device or the motor number of the vehicle.

The actuating mechanism for the printing platen 128 comprises a shaft 140 journaled on bearings 134, extending from the cover wall 125. An eccentric sleeve-like hammer member 141 is revolvably mounted on shaft 140, and an actuating sleeve 142 is mounted for revolvable and slidable movement on the outwardly projecting portion of the shaft 140. As shown in Figs. 1 and 6, on the outwardly projecting end of the sleeve 142 is mounted a handle 143 which, as shown in Fig. 6, is locked to the sleeve by screw 144 having an inwardly projecting guide key 145 shaped to engage a guide slot 146 on the shaft 140 so that when the actuating sleeve 142 is rotated by the handle 143, it slides outwardly along the shaft 140.

The inward end of the actuating sleeve 142 has a driving claw 148 (Fig. 8b) which engages a latch pin 149 slidably mounted in a longitudinal cavity 150 (Fig. 6) of the sleeve 141 and pressed outwardly by a spring 151 against a stop pin 152 extending through a slot of the latch pin 149. The hammer sleeve 141 is held in the position shown in Fig. 8 by a relatively stiff torsion spring 154 (Fig. 6). The actuating sleeve 142 is normally held in the position shown in Fig. 6 by a relatively flexible spring 155 having its ends locked in the cover bearings 134 and in a lug 156 of the actuating sleeve 142 so as to bias the handle 143 to its inward position, shown in Figs. 1 and 6. The cooperating elements of the hammer sleeve and the actuating sleeve are so arranged that when the handle is turned against the biasing action of spring 155, the driving claw 148 engages the latch 149 of the hammer sleeve and turns it, while at the same time winding its torsion spring 154, thereby storing therein spring energy for actuating the hammer sleeve 141. The driving claw 148 and the latch 149 are so located in relation to the helical guide slot 146 on the shaft 140, that near the end of the rotation of the actuating sleeve 142, the outward motion of the sleeve withdraws its claw 148 from its engagement with the latch 149 of the hammer sleeve 141, to release it. Thereupon, the energy stored in the torsion spring 154 discharges the hammer sleeve 141 against the printing platen 128 with a predetermined impact force against the sheaf of papers inserted in the slot 136 for performing the printing operation without causing any damage to the indicating mechanism.

Upon performing the printing operation, the printing platen 128 is automatically returned to its neutral position by the leaf springs 132. The rear surface of the actuating sleeve claw 148 and of the hammer sleeve latch 149 are so curved and shaped that when the handle 143 is released, and its biasing spring 155 returns it to its normal position, the latch pin 149 is pushed inwardly into its sleeve slot 150 to permit the driving claw to return to its normal position.

The exemplifications of the invention described above will suggest to those skilled in the art many other arrangements and ways for utilizing a chain mechanism of index members in forming a speed diagram of the various speeds a vehicle acquired in traveling a predetermined distance, of recording such a speed diagram and other novel features underlying the invention. It is accordingly desired that in construing the breadth of the appended claims they shall not be limited to the specific exemplifications of the invention described herein.

I claim:

1. In a speed indicating device, from which, for example, a printed record of the speed indication of a moving body may be made; driving means moving at the rate of speed to be indicated, a supporting structure, guide means including an endless array of flexibly joined guide members mounted on said supporting structure and arranged to be impelled at a predetermined speed along a guideway, and endless array of indicator elements impelled and guided by said guide members along said guideway and arranged to be individually movable relative to said guide members in a direction lateral to said guideway from a normal position to a set position, setting means including a setting member operative under the control of said driving means at a predetermined setting point for consecutively setting said individual indicator elements in a position corresponding to the momentary speed of the driving means, retaining means including at least one retaining member operative to retain a plurality of said indicator elements passing said setting point in their set positions along a diagram portion of said guideway to form a speed diagram of the motion of the body, restoring means including a restoring element located along a predetermined guideway portion for automatically restoring each indicator element passing said predetermined guideway portion to its normal position, said supporting structure including at least one rigid member located along the diagram portion of said guideway for maintaining indicating portions of the indicator elements forming said diagram arrayed substantially in a plane.

2. In a speed indicating device, from which, for example, a printed record of the speed indication of a moving body may be made: driving means moving at the rate of speed to be indicated, a supporting structure, guide means including an endless sprocket-chain mounted on said supporting structure and arranged to be impelled at a predetermined speed along a guideway, said chain having an array of hollow guide members extending transversely to said guideway and an array of overlapping link elements inter-connecting consecutive guide elements of said chain, an array of indicator elements individually mounted in the hollow interior of said guide members and impelled thereby along said guideway, said indicator elements being arranged to be individually movable relative to said guide members in a direction lateral to said guideway from a normal position to a set position, setting means including a setting member operative under the control of said driving means at a predetermined setting point for consecutively setting said individual indicator elements in a position corresponding to the momentary speed of the driving means, retaining means including at least one retaining member operative to retain a plurality of said indicator elements passing said setting point in their set positions along a diagram portion of said guideway to form a speed diagram of the motion of the body, restoring means including a restoring element located along a predetermined guideway portion for automatically restoring each indicator element passing said predetermined guideway portion to its normal position.

3. In a speed indicating device, from which, for example, a printed record of the speed indication of a moving body may be made: driving means moving at the rate of speed to be indicated, a supporting structure, guide means including an endless sprocket-chain mounted on said supporting structure and arranged to be impelled at a predetermined speed along a guideway, said chain having an array of hollow guide members extending transversely to said guideway and an array of overlapping link elements interconnecting consecutive guide elements of said chain, an array of indicator elements individually mounted in the hollow interior of said guide members and impelled thereby along said guideway, said indicator elements being arranged to be individually movable relative to said guide members in a direction lateral to said guideway from a normal position to a set position, setting means including a setting member operative under the control of said driving means at a predetermined setting point for consecutively setting said individual indicator elements in a position corresponding to the momentary speed of the driving means, retaining means including at least one retaining member operative to retain a plurality of said indicator elements passing said setting point in their set positions along a diagram portion of said guideway to form a speed diagram of the motion of the body, restoring means including a restoring element located along a predetermined guideway portion for automatically restoring each indicator element passing said predetermined guideway portion to its normal position, said supporting structure including at least one rigid member located along the diagram portion of said guideway for maintaining indicating portions of the indicator elements forming said diagram arrayed substantially in a plane.

EMMANUEL CHRIST NICHOLIDES.